Dec. 8, 1953  R. H. McELROY  2,661,980
STEEL WHEEL
Filed Dec. 6, 1949  2 Sheets-Sheet 1
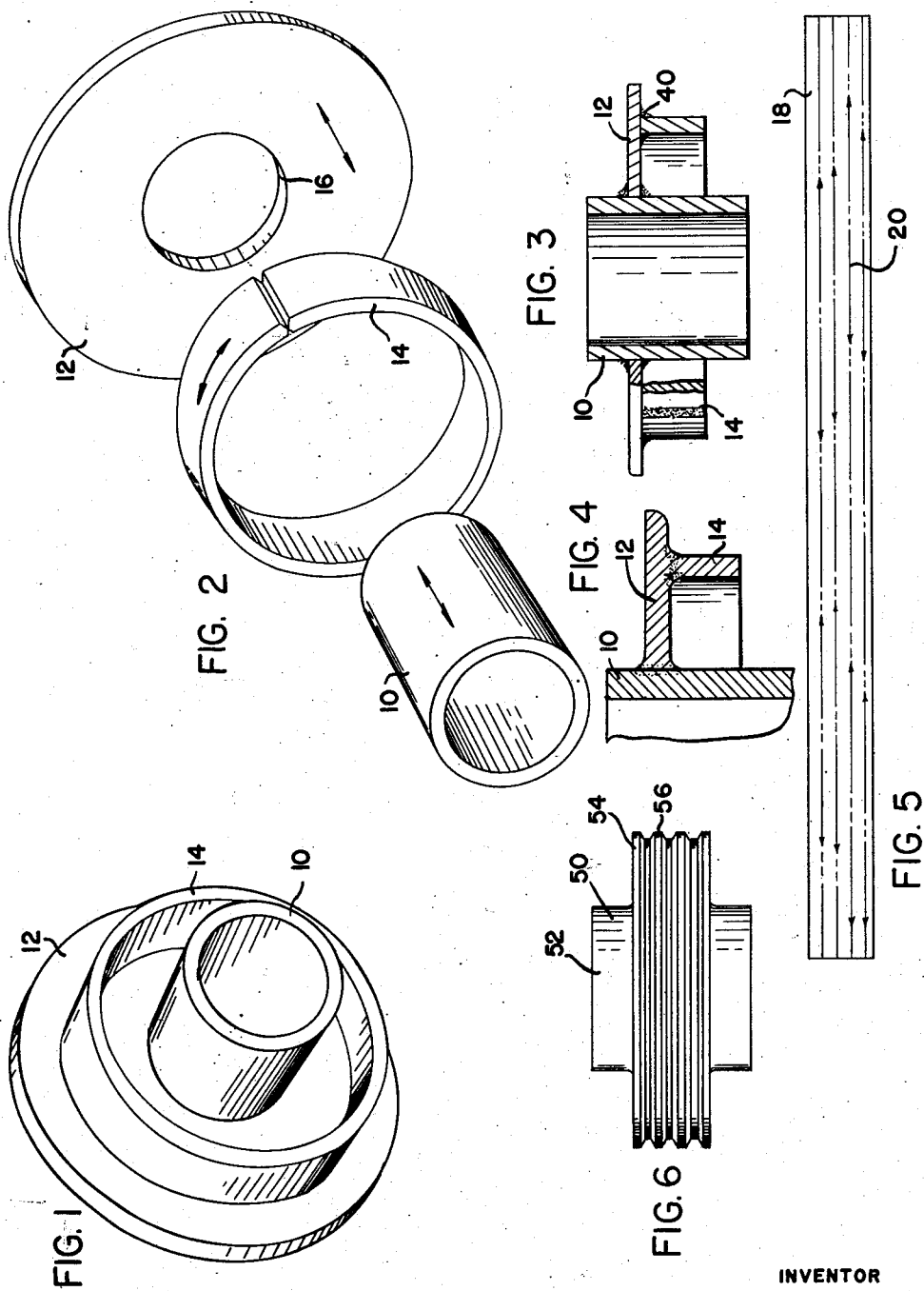
INVENTOR
ROY H. McELROY
BY
Toulmin & Toulmin
ATTORNEYS Dec. 8, 1953 R. H. McELROY 2,661,980
STEEL WHEEL
Filed Dec. 6, 1949 2 Sheets-Sheet 2

INVENTOR
ROY H. McELROY
BY
Toulmin & Toulmin
ATTORNEYS

Patented Dec. 8, 1953

2,661,980

UNITED STATES PATENT OFFICE 2,661,980

STEEL WHEEL

Roy H. McElroy, Dayton, Ohio, assignor to International Clay Machinery Company, Dayton, Ohio, a corporation of Ohio Application December 6, 1949, Serial No. 131,347

2 Claims. (Cl. 295—16)

This invention relates to a fabricated steel wheel or sheave and to a method of manufacture therefor. More particularly, this invention relates to a steel wheel or sheave and to a method of fabricating such an article by welding.

Wheels and sheaves of the nature with which this invention is concerned are generally cast or forged in order to give them the required strength. While wheels and sheaves constructed in this manner are generally sufficiently strong for their purpose, they are necessarily quite heavy and a considerable amount of metal is employed in their manufacture.

The particular object of the instant invention is to provide a fabricated wheel or sheave which is substantially lighter than a corresponding article manufactured according to the prior art.

Still another object is to provide a method of fabricating a wheel or sheave by welding such that the resulting article is strong but relatively light.

A still further object of this invention is the provision of a method of welding such that the effect of "arc-blow" is substantially eliminated.

These and other objects and advantages will become more apparent upon reference to the following description taken in connection with the accompanying drawings, in which:

Figure 1 is a perspective view of a wheel constructed according to my invention;

Figure 2 is an exploded perspective view of the wheel showing the parts thereof before they are welded together;

Figure 3 is a sectional view through the wheel showing it as it appears after the parts have been welded together;

Figure 4 is a fragmentary view similar to Figure 3 but showing the appearance of the wheel after it has been machined;

Figure 5 is a plan view of the strip of metal which is employed for the rim plate of the wheel showing how the grain lines extend the length thereof;

Figure 6 is a view of a sheave constructed according to my invention; and

Figure 7:
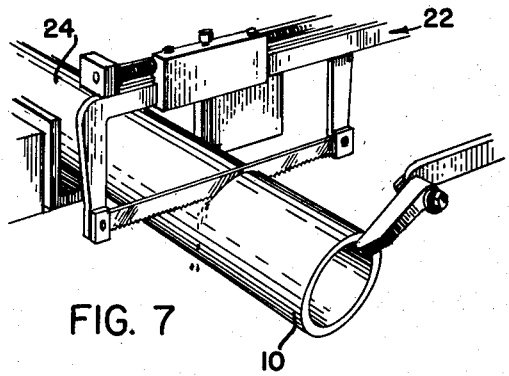
Figures 7 through 12 are views showing the process of making a wheel according to my invention.

Referring to the drawings, the wheel shown in Figures 1 through 5 comprises a hub part 10, a flange plate 12, and a rim plate 14. The flange plate 12 is centrally apertured, as at 16, for receiving hub 10, and the said hub is adapted for extending out both sides of the flange plate, as will be seen in Figures 3 and 4.

Rim plate 14 is formed of a single straight strip of material, as indicated at 18 in Figure 5. This strip is characterized in that the grain lines, indicated by the reference numeral 20 in Figure 5, extend lengthwise, so that, after the strip has been formed into a circular member, the grain lines will extend circumferentially thereof giving the rim plate the best possible wearing and strength qualities.

The preferred manner of constructing the wheel is illustrated in Figures 7 through 12. In Figure 7 there is shown a sawing device 22 which severs the hubs 10 from a length of tubing 24 according to well known sawing methods. The hubs are sawed approximately to length from double strength steel pipe with about one quarter inch left on the length to allow for finish machining of the hub ends. The mechanism employed is preferably an automatic power fed production type cut-off saw. The use of a mechanism of this type permits the saw operator to burr the hub, while the automatic saw is making the next cut.

Figure 8:
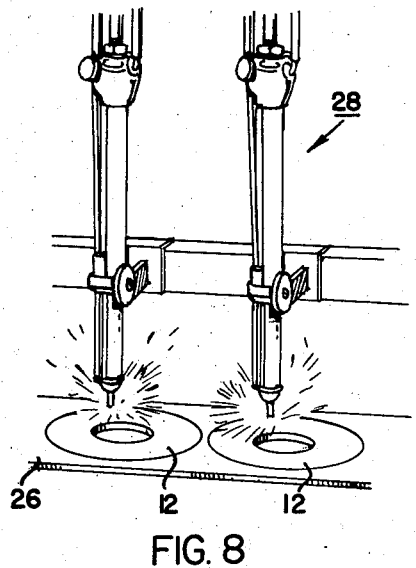

The flange plates may be cut out from sheet stock in a number of different manners but the preferred method of arriving at these work members is to cut them on a multiple type burning machine, using a number of torches simultaneously. The plate used is standard hot rolled mild steel, and control of the outside and inside diameters of the flange plate can readily be determined by use of any of a number of standard tracing devices, such as a magnetic tracing device which follows the contour of a master template. This operation is depicted in Figure 8 where it will be seen that the flange plates 12 are being cut from a sheet 26 by the burning machine, generally indicated at 28.

The rim plate is sheared to the proper length in a heavy duty bar shearing machine, and at the time of shearing, the ends of the rim plate are scarfed on the outside so that when the ends of the plate are brought together, a V notch is formed for receiving the weld metal.

Figure 9:
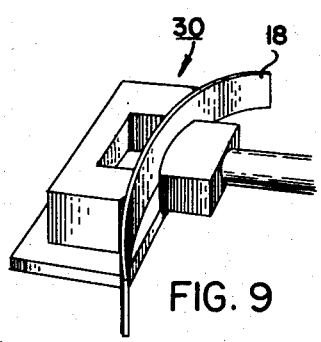

After the rim plate is sheared and scarfed, it is formed to a true circle with its ends brought together, as by the pneumatic or hydraulic bending machine illustrated at 30 in Figure 9.

The three parts of the wheel having been formed, they are now brought together in a fixture that is formed to hold the parts in proper alignment. One form which this fixture may take is illustrated at 32 in Figures 10 and 11, and it will be seen to comprise a block having one recess at 34 for receiving and supporting the hub 10, and a second recess at 36 concentric with recess 34 and adapted for receiving and supporting the formed rim plate 14.

The axial distance between the bottoms of recesses 34 and 36 is, of course, that amount necessary properly to position the hub and rim plate axially.

The flange plate 12 is receivable on the upper face of fixture 32 and locates on hub 10. Plate 12, optionally may also rest on the upper face of rim plate 14. Suitable clamping means may be employed in connection with fixture 32 for retaining the parts 10, 12, and 14 firmly in position, if necessary, but, normally, the weights of the said parts will be sufficient to prevent their shifting while being welded.

Figure 10:
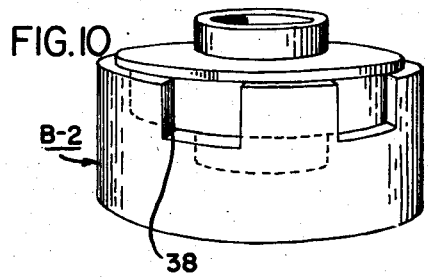

In Figure 10 it will be noted that fixture 32 has a plurality of notches 38 around the upper portion thereof, and these are for the purpose of gaining access to the under side of flange plate 12 for tack welding it to rim plate 14.

Figure 12:
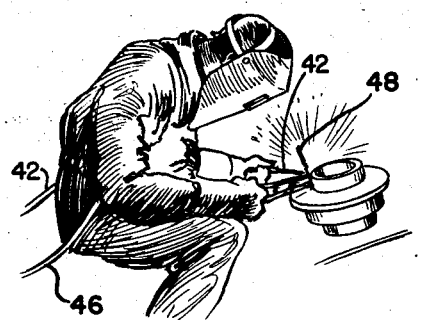
Figure 11:
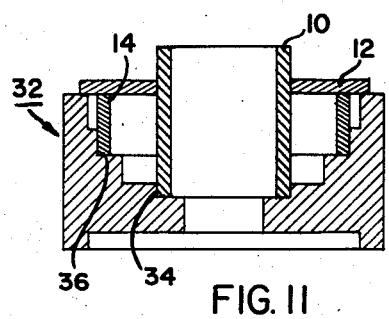

After the hub, rim plate, and flange plate are properly assembled in fixture 32, they are tack welded together as at a plurality of points around the upper face of plate 12 around hub 10, and around the lower face of plate 12 where it abuts rim plate 14. After the wheel has been so tack welded, it is removed from fixture 32 and can then be finish welded as shown in Figure 12.

In finish welding the wheel, a preferred procedure is first to weld the ends of rim plate 14 together. After this weld has been made, the hub 10 is welded to flange plate 12 on both sides of the said plate. Thereafter, the inner weld around rim plate 14 and flange plate 12 is formed, and, finally, the outer weld between the flange plate and the rim plate is formed.

The last-mentioned weld, indicated at 40 in Figure 3, is utilized for forming the fillet between the flange plate and rim plate which is necessary when the wheel is to be utilized with a railroad rail or the like. It will be noted that various sized fillets can be formed between the flange and rim plate in order to accommodate for different sizes of standard rails, but that in every case the flange plate and the rim plate are formed of flat stock with the wheel material in the fillet forming substantially all of the fillet material.

After the wheel has been completely welded up as illustrated in Figure 3, it is then machined by facing off the ends of the hub, finish turning the hub on the inside, turning down the outer diameter of the rim plate, the face of the flange plate on the rim plate side, and the fillet between the rim plate and flange plate. The wheel then has the configuration illustrated in Figure 4 and is ready for mounting on an axle for use.

In connection with the welding of the wheel, particularly the forming of the fillet 40 around the outside of the rim plate, I have found that much more uniform results obtain if a welding technique which I have developed is employed. This technique was developed for the purpose of eliminating the magnetic phenomenon known as "arc-blow," and is characterized in that the welding operator holds or carries the ground cable to which a suitable handle is attached.

In Figure 12 the ground cable is indicated at 42 and the handle thereon at 44. The cable supplying current to the welding electrode is indicated at 46 and the electrode is at 48. As the welding proceeds at 40 around the outside of the rim plate, the operator shifts the ground connection whenever necessary to break up the magnetic field set up by the welding current. The disposition of the magnetic field due to the welding current can thus be changed relative to the point being welded, so that the said field does not become strong enough to pull the weld metal out of position during its deposition.

Preferably, the operator moves the ground connection together with the electrode so the field is continuously of such a nature that not only does it not pull the weld metal out of place, but actually forces it into proper position. Arc blow is thus put to useful work with the result of a better, more uniform weld, more easily applied, and with very little spatter.

In this manner, a very uniform fillet can be formed, and this is of particular merit in connection with the wheel which has been described, because the fillet formed is subsequently machined to a particular radius, and it is accordingly essential that the fillet be properly shaped so that sufficient metal is provided for cleaning up the fillet when the wheel is turned, but at the same time preventing an excess deposition of metal which might interfere with the machining.

It will be evident from the foregoing that the particular type of wheel illustrated is not the only one that can be formed according to my method, and another type workpiece is illustrated at 50 in Figure 6.

This workpiece is a sheave, but may be considered to consist of substantially the same elements, in that there is a hub 52 and one or more flange plates 54 welded to the hub. A rim plate may be employed for the grooved outer portion 54, or this portion may be formed by a combination of a rim plate and a plurality of flange plates. In any case, the hub is formed from tubular stock, and the flange plate and rim plate from flat stock, and welded together according to the method described.

It will be evident that wheel or sheave formed according to this invention is substantially lighter than one formed by casting or forging according to the prior art, but will exhibit substantially equivalent strength, because the metal in the wheel is very uniform and can be selected in order to have the best characteristics for that part of the wheel which it forms.

The producing of the wheel and sheave is more inexpensive because costly forging dies and forging machinery are eliminated, and instead only that equipment normally found in small shops is employed.

It will be understood that this invention is susceptible to modification in order to adapt it to different usages and conditions, and, accordingly, it is desired to comprehend such modifications with this invention as may fall within the scope of the appended claims.

I claim:

1. A weldment of the nature described comprising a flat flange plate of uniform thickness and having a central aperture, a tubular hub of uniform thickness throughout extending through said aperture with its axis normal to the plane of the plate and welded to this said plate on both sides thereof, a rim member comprising a strip of metal of uniform thickness rolled up to form a cylinder with the ends of the strip welded together, said rim member being mounted on one side of said plate concentrically with said hub and being welded to said plate on both sides of the edge of the rim member which abuts the plate, the grain lines of said rim member extending circumferentially thereof, the periphery of said plate extending outwardly beyond said rim to form a flange, and the welding forming the sole connection between said plate and hub and rim members.

2. A weldment of the nature described for use as a car wheel comprising a flat flange plate cut from flat metal stock of uniform thickness, a central aperture in said flange plate, a tubular hub cut from tubular stock having a uniform thickness throughout, said hub extending through said aperture with its axis normal to the plane of the plate and welded to said plate on both sides thereof, a rim member comprising a strip of metal, said strip being cut from flat metal stock of uniform thickness and rolled up to form a cylinder with the ends of the strip welded together, said rim member mounted on one side of said plate concentrically with said hub and being welded to said plate on both sides of the edge of the rim member which abuts said plate, the weld material around said rim member on the outside thereof forming material for a fillet between the plate and rim member when the weldment is machined, said fillet being provided for engagement with the rail on which the wheel is to run.

ROY H. McELROY.

References Cited in the file of this patent

UNITED STATES PATENTS

| Number | Name | Date |
|---|---|---|
| 388,245 | Benardos | Aug. 21, 1888 |
| 395,878 | Coffin | Jan. 8, 1889 |
| 462,606 | Vauclin | Nov. 3, 1891 |
| 1,304,494 | McNeil | May 20, 1919 |
| 1,738,414 | Winter | Dec. 3, 1929 |
| 1,888,027 | Chapman | Nov. 15, 1932 |
| 1,945,506 | Angle | Feb. 6, 1934 |
| 1,965,203 | Sinclair | July 3, 1934 |
| 1,993,430 | Bell | Mar. 5, 1935 |
| 2,046,216 | Steward | June 30, 1936 |
| 2,063,706 | Soderberg | Dec. 8, 1936 |
| 2,083,326 | Eksergian | June 8, 1937 |
| 2,110,357 | Doerr | Mar. 8, 1938 |
| 2,139,288 | Shipley | Dec. 6, 1938 |
| 2,170,305 | Ingwersen | Aug. 22, 1939 |
| 2,273,620 | Piron | Feb. 17, 1942 |
| 2,295,531 | Heaslet | Sept. 15, 1942 |
| 2,363,182 | Hunt | Nov. 21, 1944 |
| 2,519,548 | Cornell | Aug. 22, 1950 |